Feb. 28, 1950 E. R. LOCHMAN 2,499,193
DUAL SPINDLE MACHINE TOOL
Original Filed Feb. 18, 1939 3 Sheets-Sheet 3
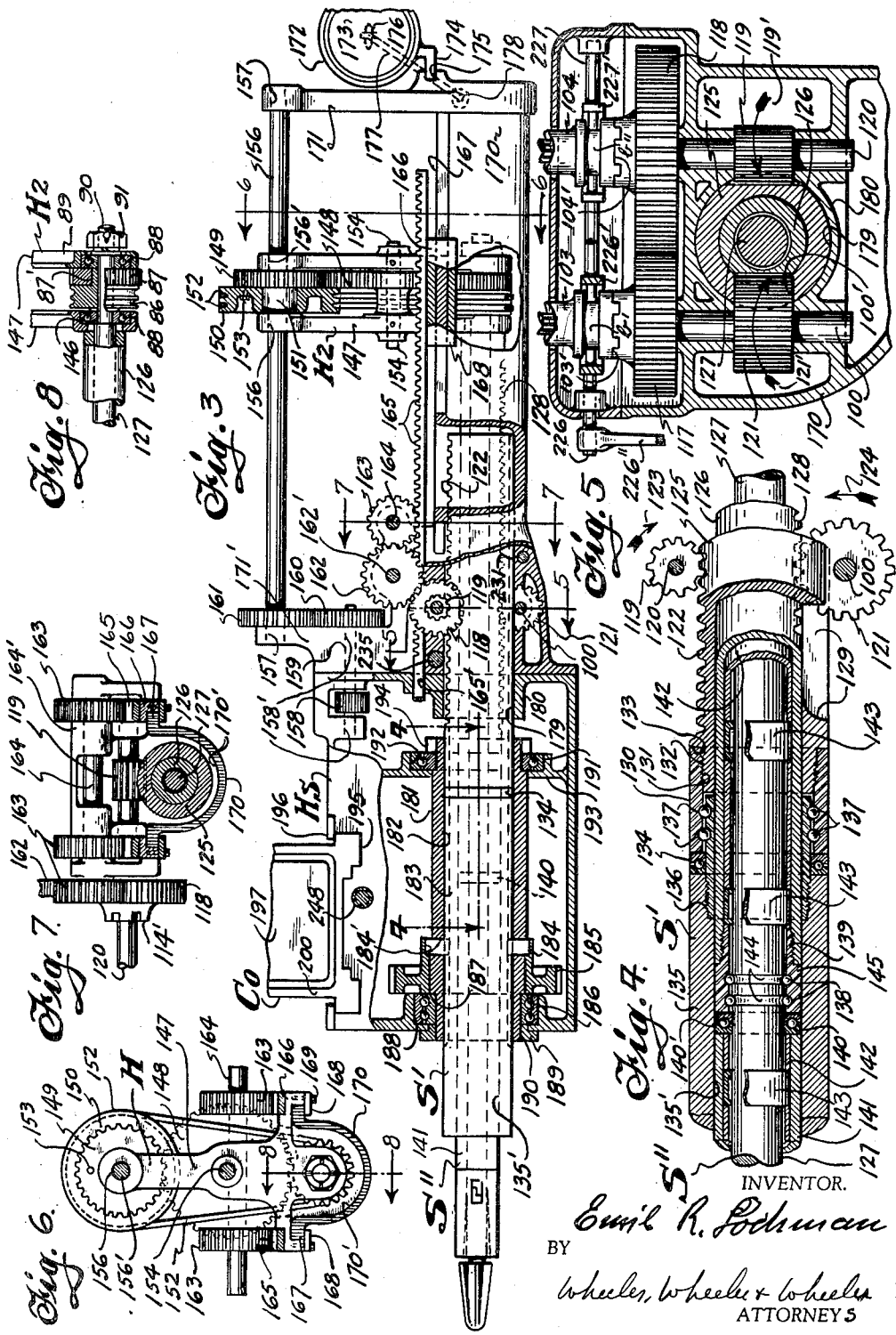
INVENTOR.
Emil R. Lochman
BY
Wheeler, Wheeler & Wheeler
ATTORNEYS Patented Feb. 28, 1950

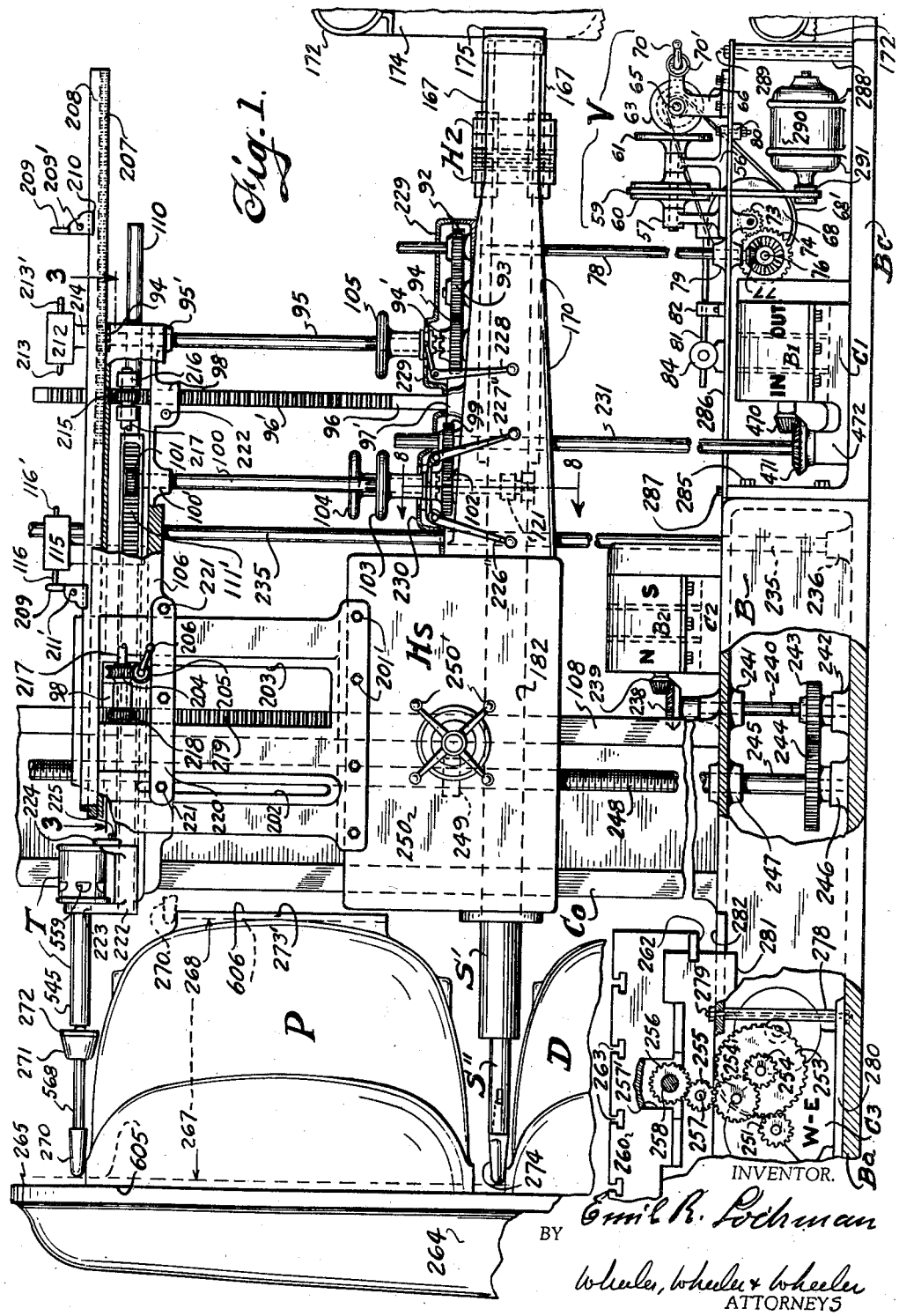

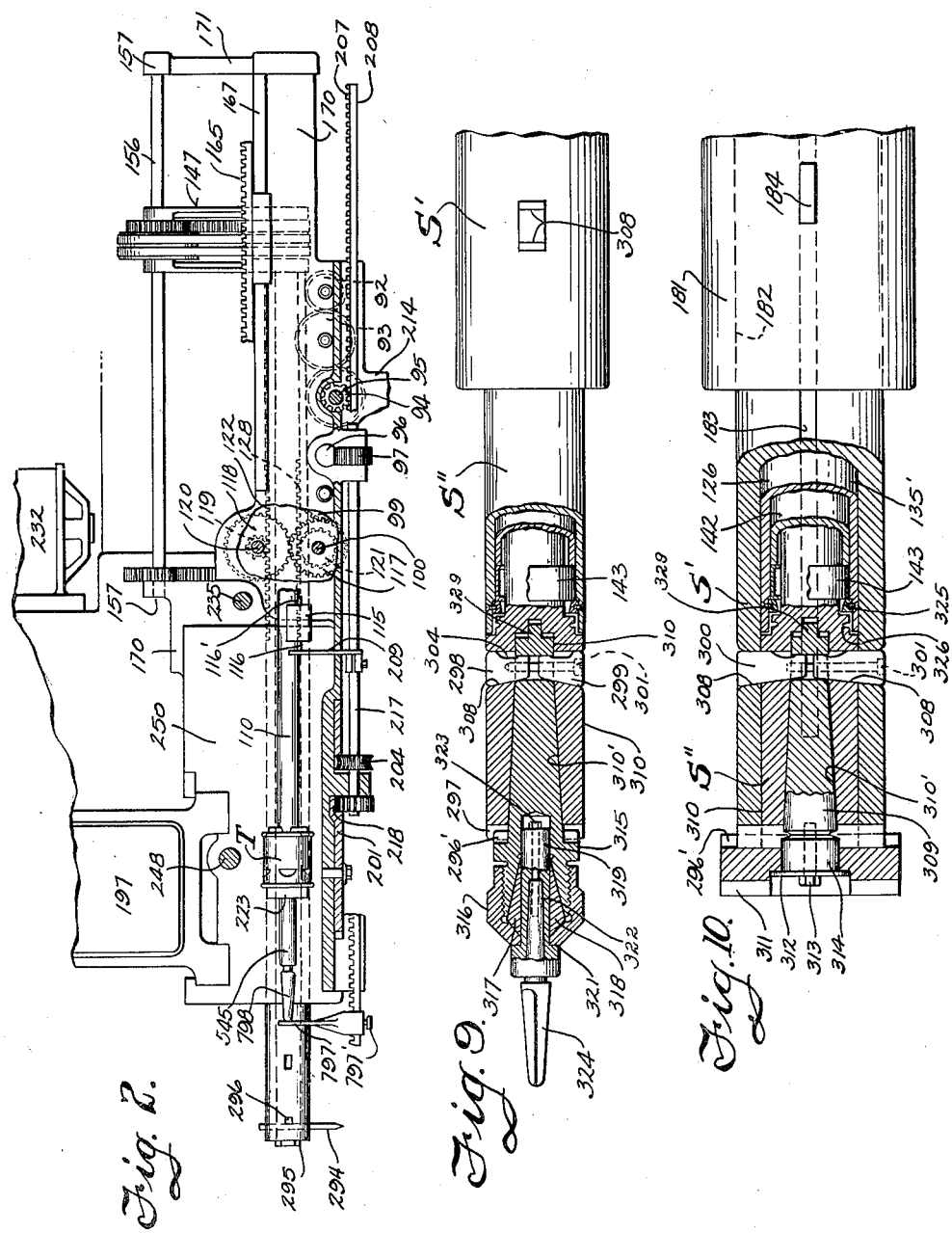

2,499,193

UNITED STATES PATENT OFFICE 2,499,193

DUAL SPINDLE MACHINE TOOL

Emil R. Lochman, Milwaukee, Wis.

Original application February 18, 1939, Serial No. 257,216. Divided and this application February 28, 1944, Serial No. 524,168

7 Claims. (Cl. 90—14)

This invention relates to a dual spindle machine tool.

It is the object of the invention to provide an axially extensible spindle with an axially extensible support which also preferably constitutes a spindle. Where both the inner spindle and the support are rotatable as spindles, it is my purpose to provide means for driving them at differing speeds and for selectively coupling a tool to the inner spindle or the outer spindle in an arrangement which permits me to couple both spindles together to function unitarily as a heavy duty spindle, when required.

It is my further purpose to provide means whereby the advance and retraction of the spindle and its support may be effected concurrently and at differing rates so that the support provided for the spindle may be extended to any desired proportion of the distance between the column and the tool, regardless of how far the tool and its spindle may be extended at any given time.

It is a further object of the invention to provide novel and improved controls both for the rotation and the axial movement of the respective spindles, whereby they may be fed or rotated at the same or different rates and either together or independently and either with power or under hand control, each spindle serving as a support for the other when the other is in use.

Other objects and advantages will be apparent upon reference to the following specification and drawings.

In the drawings:

Fig. 1 is a front elevation of a machine tool illustrating one application in which the present spindle invention is useful.

Fig. 2 is a plan view of a portion of the headstock of the machine shown in Fig. 1 with parts broken away to show an auxiliary headstock for the inner spindle, and also details including the gearing which feeds the spindles.

Fig. 3 is a plan view on an enlarged scale of a portion of the headstock with parts broken away to show details, some of the drive mechanism and outer spindle bearing being shown in cross section.

Fig. 4 is a cross sectional view taken on line 4—4 of Fig. 3.

Fig. 5 is a cross sectional view taken on line 5—5 of Fig. 3.

Fig. 6 is a cross sectional view taken on line 6—6 of Fig. 3.

Fig. 7 is a cross sectional view taken on line 7—7 of Fig. 3.

Fig. 8 is in part an elevation and in part a sectional view on line 8—8 of Fig. 6.

Fig. 9 is a cross sectional view of the tool-carrying head of the inner spindle, showing the chuck, tool holder and tool in locked position, ready for operation.

Fig. 10 is a cross-sectional view of the tool-carrying heads of both spindles, showing a large facing tool in locked position to both spindles, ready for operation.

The present application is a division of my application 257,216, filed February 18, 1939, and now abandoned and entitled Multiple purpose tracer controlled machines for die sinking, duplicating, boring and general milling functions. For said application, I am now filing a substitute as a companion to the present application. The reference characters used in the parent application are used throughout the drawings of the present application.

The machine tool illustrated as an exemplification in which the present invention is embodied is of the type known as a horizontal boring machine. In such a machine, my improved spindle organization has particularly utility.

Referring more particularly to the drawing, the machine constituting the exemplary embodiment of my invention comprises a main bed B having a forward extending bed Ba with horizontal slides 282 on which the saddle 281 has a sliding support and in turn carries the table 260 on which the large angle plate 264 is set and bolted in the T slots 263. The vertical column Co is firmly mounted on the rearward part of the base B and is provided with slides 108 on which the headstock Hs is adapted to travel. The headstock comprises an outer horizontal spindle S' and an inner spindle S'' adapted for endwise sliding support in the bore 135' of said outer spindle. The customary end support for boring bars (not shown) may be used with the machine, as well as various kinds of work supports. The headstock Hs is moved up and down on said column by means of feed screw 248, and the power for driving the spindles is provided by the large motor 232 suitably mounted on base B, while the splined shaft 235 transmits the power from said motor to the driven parts of the headstock.

Headstock

The headstock Hs comprises a box-shaped casing 250 with a long rearward extension 170 firmly mounted thereto and forming one unit therewith. The casing 250 has a bearing 180 and its bore 179 extends into the outer casing 170 and forms the principal rearward guide for the outer spindle S' (see Fig. 3) while its outer part has its bearing in a driving sleeve 181 which in turn is held in anti-friction bearings 186, 191, mounted in recesses 188, 192 and having a lock nut 189 fitted on the screw threaded sleeve 190 and thereby holding said driving sleeve with its driving gear 185 in free driving position and in proper alignment with said rear bore 179. Said driving sleeve has the driving spline keys 184 firmly held in the slots 184' and they project inwardly into two diametrically opposed longitudinal grooves 183 (see Fig. 10) thereby allowing longitudinal sliding motion of said outer spindle S' while being driven and guided by said driving sleeve 181 and gear 185.

It is exceedingly important that for efficient, speedy cutting action at long reach out of its bearing, a greatly improved spindle construction is required, and my inner high speed spindle S" is brought out for said purpose. It comprises the solid inner spindle 127, a bearing sleeve 141 into which certain anti-friction pin bearings 143 are driven and held in proper spaced position by spacers 142 (see Figs. 3, 4, 9 and 10) and said bearings 143 and spacers 142 are held in position at the front end by collar 325, and the rear end is held by the thrust bearing 140 which in turn is pressed against the shoulder 140' of the guide bearing 145 whose anti-friction bearings engage the ball grooves 144 of the spindle 127, and so forms the guide connection between the running spindle 127 and the non-revolving inner ram 126.

The guide bearing 145 is tightly screwed into the sleeve-like ram 126 and forms the shoulder for the first pin bearing 143 tightly driven into the ram sleeve 126. A number of like bearings 143 are held in spaced positions within said ram sleeve, while its rear end is firmly held against the bearings 147, 147 of the auxiliary headstock H2. The ball bearings 88, 88 held in sockets 146, 146 hold the driving sheave 86 and pinion 87 both tightly mounted on said spindle 127 in running position without end play, such ball bearings being securely locked by the lock nut 91 forced tightly on the screw threaded end 90 of the spindle 127 and gripping the inner race of said ball bearing by suitable lock washers. The entire straight shank of the inner spindle 127 is hardened and ground, and being of even diameter the pins of the respective pin bearings 143 bear directly against the surface of said spindle. Ball grooves 144 are cut and ground into the surface of said spindle and by suitably inserting the balls into said grooves and the grooves of the guide bearing 145, the inner spindle has a guide connection for lengthwise feeding motion of the non-revolving inner ram.

The outer spindle S' has a like guide bearing connection 130 between it and the non-revolving outer ram 125 (see Fig. 4), except that its inner ball race has a forward extension 136 tightly screw-locked into the running tube-like spindle 135, while its rearward extension 131 is tightly screw-locked on the offset 132 against the shoulder 133 of the non-revolving outer ram 125.

It will be noted that the end thrust bearing 134 is interposed between said spindle and ram when these parts are assembled by means of said guide bearing 130. Thus, for heavy cutting of the combined inner and outer spindle, there are two end thrust bearings 140 and 134 to take up said end thrust. Bore 135' properly machined in said outer spindle S' and ram 125 forms a continuous endwise sliding passage for the inner spindle S" together with its bearing sleeve 141, including its tool head 310, which draws into the tool head of the outer spindle S' (see Fig. 10).

When the inner spindle is thus retracted, the cross slot 297 receives the lock key 296' of the large facing tool 311 (see Fig. 10). This large tool is drawn into the taper socket 310' by the self-balancing wedges 300 drawing rearward on the inclined slots 308, 308 cut through both tool headings, and bringing the tang 329 into its respective slot, then securing the said wedges with binding screw 301. This firmly ties the inner and outer spindle together for combined support of large cutting tools in heavy cutting.

The inner high speed spindle S" is equipped with a special chuck 315, and having its taper shank drawn in and locked with shorter balancing wedges 298, 298, drawn slightly below the outer surface and locked with binding screw 299 so the entire tool head can be drawn into the outer spindle S'. Said chuck is further equipped with a tool holder 321 having a taper socket 322 into which the taper shank of the tool 324 is drawn and locked by screw 323. Said tool holder has a shoulder 321 abutting at the front end of the chuck to which it is set for correct positioning of the tool with the tracer, without resetting the tracer, thus saving time when changing tools.

The driving and feeding of the respective outer and inner spindles will be further described:

Headstock gearing for the ordinary driving mechanism of the spindle is old and well known and to avoid complication the direct connection between the main splined driving shaft 235 to the respective driving gears 185 for the outer spindle S' and the gear 158 for the inner spindle S" is not shown. Therefore these two gears (see Fig. 5) are the driving gears for the respective two spindles and suitable connecting gears will be interposed for driving said two gears 185, 185 at respectively varying speeds as needed for the said low speed outer and high speed inner spindles. The new drive and application of the inner high speed spindle is as follows: Suitable bearings 158' are provided for the stub shaft on which the driving gears 158, 160 are rigidly mounted for driving the splined shaft 156 journaled in bearings 157 of brackets 171, 171' by means of gear 161 rigidly mounted on said shaft 156.

In order to produce the large automobile body dies as shown in Fig. 1, the dual spindle arrangement as shown in detail in Figs. 3, 4, 5, 6, 7 and 8 is required to overcome difficulties experienced in the use of known machines, where high speeds for driving small cutting tools are impossible, on account of the heavy weight and mass of material turning. While tool supporting sleeves are known, they have heretofore been splined to the spindle for driving it, and the entire mass is driven by a heavy driving sleeve, like the one shown at 181. Spindles for said work are about five inches in diameter and six feet six inches in length and weigh about 480 pounds, so the highest speed practicable for driving them is 500 R. P. M. My inner spindle with its separate headstock S2 and separate multi-drive arrangement is only about three inches in diameter, by about six feet six inches in length and weighs with its driving gear 150 pounds which is less than one-third of the combined weight of the two spindles. Consequently it can be driven up to 4000 R. P. M. and even up to 6000 R. P. M. for grinding operations.

*Auxiliary headstock*

The auxiliary headstock H2 comprises an open frame casting 147 having bearings 156' for the splined shaft 156 at the outer end and bearings 88 at the inner end for suitably mounting the sheave 86 and pinion 87 for driving and feeding connection of the inner spindle S", said assembly being held in running order by the lock nut 91 (see Fig. 8). The slides 166 of said casting form a sliding connection with the slides 167 of the casing 170, and the bearing plates 168 mounted with cap screws 169 keep said headstock in correct sliding position with the axis of said spindle. The driving gear 149 has a splined hub in sliding and driving connection with said splined shaft 156 while the sheave 150 turns as a loose pulley on said hub 151 when said inner spindle is driven at slower speeds by said gears by means of the connecting gear 148 held in removable position by the stub shaft 154. When said inner spindle is driven at high speeds said connecting gear 148 is taken out, and the driving clutch pin 153 is inserted and rigidly connects said sheave 150 with the gear 149. The V belts 152 then drive said inner spindle at varying speeds up to 6000 R. P. M. The variable speed drive gears, not shown, for said auxiliary headstock are inserted in the large gear casing 250 of the headstock Hs and connected to said driving gear 158.

Means are provided for hand as well as automatic axial feeding of the two spindles comprising the hand wheels 103, 104 having end clutches 103', 104' (see Fig. 5) thereby adjustably engaging the loose gears 117, 118 and pinions 121, 119 firmly mounted on their respective shafts 100, 120 with their outer or upper parts splined for shifting motion of said hand wheels which have grooves b', b'' engaged by yokes 226', 227' mounted on rock shafts 226, 227 with adjusting levers 226'', 227'' for operating said end clutches. Both of them are engaged, thereby feeding both spindles in the same direction (see arrows 121', 119') by means of the respective pinions 121, 119 engaging racks 128, 122 (see Fig. 3) the respective gears and pinions being adapted to feed the inner spindle S'' at about double the speed of the outer spindle S', which then acts as a guide for the inner spindle. As shown in Fig. 4, the outer ram 125 has a slot 129 for pinion 121 to pass and engage the rack 128 of the inner ram 126 which is useful for certain machines. In other machines requiring extreme precision, said slot may have a slight tendency to cause deflection. Therefore the outer racks 165, 165 are applied and rigidly mounted on the seats 166 of the auxiliary headstock H2 and the gears 163 engaging said racks draw and push the said headstock, thus applying axial motion to the inner spindle without slotting the said outer ram.

The gear connection for said outer rack feeding device includes the stub shafts 162', 164, the connecting gear 162 and three pinions 163 tightly mounted on stub shaft 164 for jointly operating the two racks 165, thereby feeding both spindles in the same axial direction but feeding the inner spindle at about twice the speed of the outer spindle S' (see Figs. 3 and 7). Said Fig. 7 further shows an unbroken sectional view of the outer ram 125, inner ram 126 and spindle 127, as well as clearance 170' for said outer ram and spindle in the casing 170.

To this casing the end bracket 171 is removably mounted at its outer end. It has a guiding slot 175 engaging the slide 174, which is preferably welded onto a large steel tubing forming an end support 172 for the headstock Hs, and assisting in the balancing thereof by the inserted counterweight 173 attached to wire rope 177 shown in dotted position. Even without the supporting sheave or sheaves fastened at 176 to the weight, and at 178 to the headstock, this end support prevents vibration of the headstock when the spindles run at high speed and increases the precision performance of the cutting tool. Said end support 172 is firmly mounted to the base Bc, mounted on and forming a rear extension to the base B, and its height is about the same as that of the column Co.

It will be observed from the foregoing disclosure of my invention that I have provided means whereby a tool carrying spindle may be extended to any desired degree and supported in all positions by a bearing which forms no essential part of the spindle, but may be rotated either at the same speed or at a different speed, as desired, or may remain stationary. The arrangement minimizes friction and reduces the weight of rotating parts where high speed operation is desired, at the same time providing auxiliary support when needed, or permitting the two spindles to turn as one when the work requirements are extremely heavy.

I claim:

1. In a device of the character described, the combination with concentric spindles, each mounted for axial and rotative motion, of independent driving connections for the respective spindles, whereby either may be primarily actuated, feed means for the axial movement of the respective spindles, and chuck means comprising mechanism for locking the spindles together for concurrent movement.

2. In a device of the character described, the combination of concentric inner high speed and outer low speed spindles, the high speed spindle being mounted for axial and rotative movement in the low speed spindle and the low speed spindle being provided with a mounting in which it is independently mounted for axial and rotative movement, feed means individual to the respective spindles for the advance and retraction thereof, driving means individual to the respective spindles for the rotation thereof, and means for locking the respective spindles together for concurrent movement at the rate and direction at which either is primarily operated, said locking means comprising opposed wedge elements in balance with respect to the common axis of said spindles.

3. A machine tool element provided with a bearing, a sleeve rotatable in the bearing, a spindle support mounted in the sleeve for rotation therewith and axially reciprocable through the sleeve, said support being provided internally with bearing means, a spindle reciprocable in said last mentioned bearing means and rotatable therein, a ram connected with the spindle for the advance thereof, a driving carriage movable with the ram and including means for the rotation of the spindle, a ram connected with said support for the axial advance of the support in said sleeve, and means for the rotation of said support, said support comprising an auxiliary spindle.

4. The combination with co-axial spindles including a high speed inner spindle and a low speed outer spindle providing support for the inner spindle, and means mounting said spindles for rotative and axial movement, of means for rotating said spindles, separate rams for controlling the axial position of said spindles, racks connected with the respective rams, pinions meshing with the respective racks, motion transmitting connections for driving said pinions for advancing and retracting said rams concurrently, said connections including drives of differing ratio to the respective pinions, whereby the concurrent advance and retraction of said spindles will be at differing rates, and clutch means for disconnecting one of said pinions from its respective driving connections for effecting adjustment of the relative positions of said spindles.

5. In a device of the character described, the combination with a rotatably mounted sleeve, of a tubular spindle element mounted in said sleeve for rotation therewith and reciprocation therethrough, an inner spindle element rotatable and axially reciprocable in the tubular spindle element, an external ram provided with thrust bearing connection with the tubular spindle element, and having rack teeth, a pinion meshing with said rack teeth for the advance and retraction of the tubular spindle element axially respective said sleeve, an internal ram provided with thrust bearing connection with the inner spindle element and projecting from the external ram and provided with rack teeth, a pinion co-acting with the rack teeth of the internal ram for advance and retraction of the internal ram and the inner spindle element respecting the tubular spindle element, said inner spindle element projecting beyond said rams, means for the rotation of the tubular spindle element, a carriage reciprocable with the inner ram, and driving connections to the inner spindle element carried in part by said carriage.

6. The device of claim 5, in which the pinions meshing with the racks of the respective rams are provided with interconnected driving means for the concurrent actuation of said rams.

7. The device of claim 5, in which the pinions meshing with the racks of the respective rams are provided with interconnected driving means for the concurrent actuation of said rams, the connection of said driving means to at least one of said pinions including clutch means disengageable to permit of the relative adjustment of said rams.

EMIL R. LOCHMAN.

REFERENCES CITED

The following references are of record in the file of this patent:

UNITED STATES PATENTS

| Number | Name | Date |
|---|---|---|
| 1,356,807 | Craft et al. | Oct. 26, 1920 |
| 1,413,174 | Lumsden | Apr. 18, 1922 |
| 1,594,903 | Gray | Aug. 3, 1926 |
| 1,933,575 | Woytych | Nov. 7, 1933 |
| 2,051,965 | Roth | Aug. 25, 1936 |
| 2,089,410 | Olson | Aug. 10, 1937 |
| 2,153,424 | MacRae | Apr. 4, 1939 |
| 2,345,060 | Morton | Mar. 28, 1944 |

FOREIGN PATENTS

| Number | Country | Date |
|---|---|---|
| 379,917 | France | Nov. 22, 1907 |